(12) United States Patent
Utsunomiya et al.

(10) Patent No.: US 10,333,400 B2
(45) Date of Patent: Jun. 25, 2019

(54) BOOST DC-DC CONVERTER INCLUDING A SWITCHING ELEMENT

(71) Applicants: SII Semiconductor Corporation, Chiba-shi, Chiba (JP); The Ritsumeikan Trust, Kyoto-shi, Kyoto (JP)

(72) Inventors: Fumiyasu Utsunomiya, Chiba (JP); Takakuni Douseki, Kusatsu (JP); Ami Tanaka, Kusatsu (JP)

(73) Assignee: ABLIC INC., Chiba (JP)

( * ) Notice: Subject to any disclaimer, the term of this patent is extended or adjusted under 35 U.S.C. 154(b) by 21 days.

(21) Appl. No.: 15/839,162

(22) Filed: Dec. 12, 2017

(65) Prior Publication Data

US 2018/0175727 A1 Jun. 21, 2018

(30) Foreign Application Priority Data

Dec. 15, 2016 (JP) ................................ 2016-243695

(51) Int. Cl.
*H02M 1/36* (2007.01)
*H02M 3/156* (2006.01)
(Continued)

(52) U.S. Cl.
CPC .......... *H02M 3/156* (2013.01); *H02H 7/1213* (2013.01); *H02M 1/36* (2013.01);
(Continued)

(58) Field of Classification Search
CPC ........ H02M 3/07; H02M 3/137; H02M 3/156; H02M 2001/0009; H02M 1/4225;
(Continued)

(56) References Cited

U.S. PATENT DOCUMENTS

| 2005/0265052 | A1 | 12/2005 | Utunomiya |
| 2007/0210774 | A1 | 9/2007 | Kimura et al. |
| 2009/0190384 | A1* | 7/2009 | Thompson et al. .... H02M 7/00 363/125 |

FOREIGN PATENT DOCUMENTS

JP 2009-54110 A 10/2009

OTHER PUBLICATIONS

Tanaka Ami et al., "Wearable Self-Powered Diaper-Shaped Urinary-Incontinence Sensor Suppressing Response-Time Variation with 0.3 V Start-Up Converter" IEEE Sensors Journal, IEEE Service Center, New York, NY, US, vol. 16, No. 10, dated May 15, 2016.
(Continued)

*Primary Examiner* — Jue Zhang
*Assistant Examiner* — Jye-June Lee
(74) *Attorney, Agent, or Firm* — Brinks Gilson & Lione

(57) ABSTRACT

A boost DC-DC converter includes: an input terminal; an output terminal; a first boost circuit configured to generate, from an input power to the input terminal, a first boosted power having a higher voltage than a voltage of the input power, and outputs the generated first boosted power from the output terminal; a second boost circuit configured to generate, from the input power, a second boosted power having a higher voltage than the voltage of the input power; and a storage capacitor configured to store the second boosted power as a storage power, and supply the storage power to the first boost circuit as an operation power source. The first boost circuit is configured to start a boost operation with the storage power when a voltage of the storage power is equal to or higher than a minimum operation voltage of the first boost circuit.

4 Claims, 3 Drawing Sheets

(51) Int. Cl.
    *H02H 7/12* (2006.01)
    *H02M 1/42* (2007.01)
    *H02M 3/07* (2006.01)
    *H02M 3/137* (2006.01)
    *H02M 3/155* (2006.01)
    *H02M 1/00* (2006.01)
    *H02J 1/00* (2006.01)

(52) U.S. Cl.
    CPC ........... *H02M 1/4225* (2013.01); *H02M 3/07* (2013.01); *H02M 3/137* (2013.01); *H02J 2001/008* (2013.01); *H02M 3/155* (2013.01); *H02M 2001/0006* (2013.01); *H02M 2001/0009* (2013.01); *H02M 2001/0067* (2013.01)

(58) Field of Classification Search
    CPC . H02M 2001/0067; H02M 2001/0006; H02M 2001/008; H02M 1/32
    See application file for complete search history.

(56) References Cited

OTHER PUBLICATIONS

European Patent Office, Extended European Search Report in European Application No. 17207134.2 dated Apr. 18, 2018, pp. 1-8.

\* cited by examiner

BOOST DC-DC CONVERTER INCLUDING A SWITCHING ELEMENT

RELATED APPLICATIONS

This application claims priority under 35 U.S.C. § 119 to Japanese Patent Application No. 2016-243695 filed on Dec. 15, 2016, the entire content of which is hereby incorporated by reference.

BACKGROUND OF THE INVENTION

1. Field of the Invention

The present invention relates to a boost DC-DC converter and a method of using the same.

2. Description of the Related Art

A boost DC-DC converter having an input terminal and an output terminal has been known (for example, refer to Japanese Unexamined Patent Application No. 2009-254110).

FIG. 3 is a schematic circuit diagram of a conventional boost DC-DC converter 300. In an example of FIG. 3, an output terminal 314 of the boost DC-DC converter 300 is connected to a ground terminal via a load 400. The boost DC-DC converter 300 boosts input power input from an input terminal 301 and supplies the boosted power to the load 400.

In the example of FIG. 3, the boost DC-DC converter 300 generates the boosted power having higher voltage than that of the input power from the input power supplied to the input terminal 301, and the boost DC-DC converter 300 outputs the generated boosted power from the output terminal 314.

The boost DC-DC converter 300 includes a coil 302, an N-channel MOS transistor 305, a diode 303, a diode 304, a diode 321, an output capacitor 311, a resistor 312, a resistor 313, and a control circuit 307.

One terminal of the coil 302 is connected to the input terminal 301. The N-channel MOS transistor 305 switches current which flows from the other terminal of the coil 302 to a ground terminal. The diode 303 rectifies the current output from the other terminal of the coil 302 and outputs the boosted power. An N-type terminal of the diode 303 is connected to the output terminal 314. The N-type terminal of the diode 303 is connected to a ground terminal via the output capacitor 311. The N-type terminal of the diode 303 is connected to a ground terminal via the resistor 312 and the resistor 313. The N-type terminal of the diode 303 is connected to a power source terminal 309 of the control circuit 307 via the diode 321.

The diode 304 rectifies the current input from the input terminal 301, and the diode 304 outputs the input power to the power source terminal 309 of the control circuit 307 as an operation power source of the control circuit 307. The other terminal of the coil 302 and a drain of the N-channel MOS transistor 305 are connected to each other.

The control circuit 307 includes a switching signal output terminal 308, the power source terminal 309, and a feedback terminal 310. The switching signal output terminal 308 outputs a switching signal for driving the N-channel MOS transistor 305 to the gate of the N-channel MOS transistor 305. The source of the N-channel MOS transistor 305 is connected to the ground terminal. The N-type terminal of the diode 303 is connected to the feedback terminal 310 via the resistor 312. The control circuit 307 controls the boosted power by controlling the N-channel MOS transistor 305 based on the input of the feedback terminal 310.

In the example of FIG. 3, when input power is supplied to the input terminal 301, the input power is input to the power source terminal 309 of the control circuit 307 via the diode 304. The control circuit 307 starts an operation by the input power supplied to the power source terminal 309. Specifically, the control circuit 307 outputs the switching signal from the switching signal output terminal 308, and switches the N-channel MOS transistor 305.

When the control circuit 307 switches on the N-channel MOS transistor 305, power is stored in the coil 302. When the control circuit 307 switches off the N-channel MOS transistor 305, the power stored in the coil 302 is output to the output terminal 314 via the diode 303. The boost DC-DC converter 300 generates the boosted power and outputs the boosted power from the output terminal 314 by repeating power accumulation and power discharge performed by the coil 302.

In the example of FIG. 3, when the boosted power is generated at the output terminal 314, the boosted power is supplied to the power source terminal 309 of the control circuit 307 via the diode 321. Accordingly, the control circuit 307 which generated the boosted power using the input power as the operation power source, generates the boosted power using the boosted power as the operation power source.

The voltage of the output terminal 314 is divided by the resistor 312 and the resistor 313, and is input to the feedback terminal 310 of the control circuit 307. The control circuit 307 controls the switching of the N-channel MOS transistor 305 such that the voltage of the feedback terminal 310 becomes a predetermined value, thereby controlling the voltage of the output terminal 314 to a desired value.

In the example of FIG. 3, the diode 304 is provided to use the input voltage to operate the control circuit 307 with a small loss of voltage, thereby reducing a value of the input voltage required to activate the control circuit 307 compared to a case without the diode 304. And the diode 321 is provided to use the boosted power having higher voltage than that of the input power as the operation power source of the control circuit 307 after the control circuit 307 is activated, thereby increasing power conversion capability.

However, in the conventional boost DC-DC converter as described above, when the voltage of the input power is lower than a minimum operation voltage of the control circuit, the control circuit cannot start operation, neither start boost operation.

When the voltage of the input power is low, the voltage of the boosted power also becomes low. A power conversion amount thus decreases. When a load of large power consumption is connected to the output terminal, the conventional boost DC-DC converter, thus, cannot raise the voltage of the output terminal to a desired voltage and fails to activate the load since the boosted power falls short of the power consumption of the load at the activation from an input power having a low voltage.

The conventional boost DC-DC converter should have a configuration having a very large conversion capability to activate the load from the input power having a low voltage when the load of large power consumption is connected to the output terminal, resulting in increase of a size of the entire DC-DC converter and also increase of a power conversion loss.

An object of the present invention is to provide a boost DC-DC converter in which a boost operation can be started even when voltage of input power becomes low, and a method of using the same.

SUMMARY OF THE INVENTION

In order to achieve the above described object, the present invention adopts the following aspects.

(1) According to an aspect of the present invention, there is provided a boost DC-DC converter including: an input terminal; an output terminal; a first boost circuit configured to generate, from an input power to the input terminal, a first boosted power having a higher voltage than a voltage of the input power, and outputs the generated first boosted power from the output terminal; a second boost circuit configured to generate, from the input power, a second boosted power having a higher voltage than the voltage of the input power; and a storage capacitor configured to store the second boosted power as a storage power, and supply the storage power to the first boost circuit as an operation power source of the first boost circuit, the first boost circuit being configured to start a boost operation with the storage power as the operation power source when a voltage of the storage power is equal to or higher than a minimum operation voltage of the first boost circuit.

(2) In the boost DC-DC converter according to the above (1), the following configuration may be configured: the first boost circuit includes a coil having a terminal connected to the input terminal, an N-channel MOS transistor configured to switch a current flowing from the other terminal of the coil to a ground terminal, a first rectifier configured to rectify a pulse current output from the other terminal to output the first boosted power, a second rectifier configured to connect to the first rectifier in parallel, and rectifies the pulse current to output a third boosted power, and a control circuit to which the third boosted power is input and configured to control the first boosted power by controlling the N-channel MOS transistor, wherein the first boost circuit is configured to perform the boost operation with the third boosted power as the operation power source when a voltage of the third boosted power is equal to or higher than the minimum operation voltage.

(3) According to another aspect of the present invention, there is provided a method of using the boost DC-DC converter according to the above (1), comprising: driving a load connected to the output terminal by the first boosted power output from the output terminal, wherein the first boosted power is equal to or higher than a power consumption of the load.

(4) According to further another aspect of the present invention, there is provided a method of using the boost DC-DC converter according to the above (2), comprising: driving a load connected to the output terminal by the first boosted power output from the output terminal, wherein the first boosted power is equal to or higher than a power consumption of the load.

According to the above-described aspects of the present invention, it is possible to provide a boost DC-DC converter in which a boost operation can be started even when the voltage of input power is low, and a method of using the same.

DETAILED DESCRIPTION OF THE PREFERRED EMBODIMENTS

First Embodiment

Hereinafter, the first embodiment of a boost DC-DC converter 100 is described with reference to the drawings.

Figure 1:
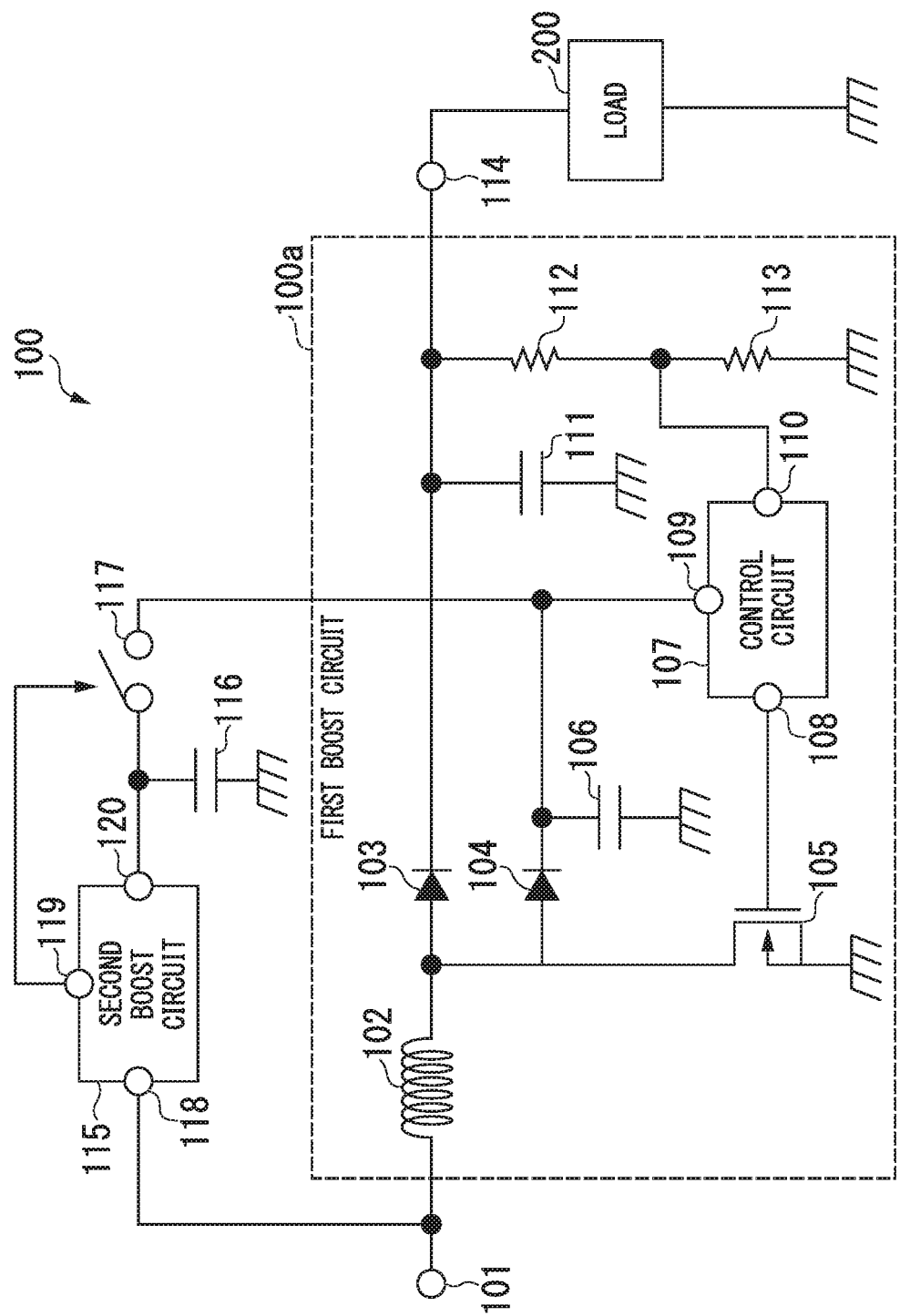
FIG. 1 is a FIG. 1 is a schematic circuit diagram of a boost DC-DC converter according to the first embodiment of the present invention.

FIG. 1 is a schematic circuit diagram of the boost DC-DC converter 100 according to the first embodiment. In the example of FIG. 1, an output terminal 114 of the boost DC-DC converter 100 according to the first embodiment is connected to a load 200. More specifically, the output terminal 114 is connected to a ground terminal via the load 200. In this example, the load 200 is a wireless communication module. In this case, the boost DC-DC converter 100 boosts input power input from an input terminal 101 and supplies the boosted input power to the wireless communication module. In another example, the load 200 other than the wireless communication module may be connected to the output terminal 114 of the boost DC-DC converter 100.

The boost DC-DC converter 100 of the first embodiment includes a first boost circuit 100a, a second boost circuit 115, and a storage capacitor 116. The first boost circuit 100a generates the first boosted power having higher voltage than voltage of the input power from the input power input to the input terminal 101, and the first boost circuit 100a outputs the generated first boosted power from the output terminal 114. The second boost circuit 115 generates the second boosted power having higher voltage than voltage of the input power from the input power input to the input terminal 101, and the second boost circuit 115 outputs the generated second boosted power from an output terminal 120 of the second boost circuit 115. The storage capacitor 116 stores the second boosted power generated by the second boost circuit 115 as storage power. The storage capacitor 116 supplies the stored storage power to a power source terminal 109 of a control circuit 107 of the first boost circuit 100a as an operation power source of the control circuit 107 of the first boost circuit 100a.

In the example of FIG. 1, the first boost circuit 100a includes a coil 102, an N-channel MOS transistor 105, a diode 103 which serves as first rectifier, a diode 104 which serves as second rectifier, a smoothing capacitor 106, an output capacitor 111, a resistor 112 and a resistor 113 which configure a bleeder resistor, and a control circuit 107.

In the example of FIG. 1, the N-channel MOS transistor 105 is applied to the boost DC-DC converter 100. However, the present invention is not limited to this configuration only. In another example, instead of the N-channel MOS transistor 105, an arbitrary switching element (not shown) may be applied to the boost DC-DC converter 100.

In the example of FIG. 1, one terminal (left one shown in FIG. 1) of the coil 102 is connected to the input terminal 101. The N-channel MOS transistor 105 switches current which flows from the other terminal (right one shown in FIG. 1) of the coil 102 to a ground terminal. The diode 103 rectifies a pulse current output from the other terminal of the coil 102 and the diode 103 outputs the first boosted power. The other terminal of the coil 102 and a P-type terminal of the diode 103 are connected to each other. An N-type terminal of the diode 103 is connected to the output terminal 114. The N-type terminal of the diode 103 is connected to a ground terminal via the output capacitor 111. The N-type terminal of the diode 103 is connected to a ground terminal via the resistor 112 and the resistor 113 forming the bleeder resistor.

The diode 104 is connected to the other terminal of the coil 102 so as to be in parallel with the diode 103. The diode 104 outputs third boosted power obtained by rectifying the pulse current output from the other terminal of the coil 102 to the power source terminal 109 of the control circuit 107 as the operation power source of the control circuit 107. The other terminal of the coil 102 and a P-type terminal of the diode 104 are connected to each other. An N-type terminal of the diode 104 is connected to the power source terminal 109. The N-type terminal of the diode 104 is connected to a ground terminal via the smoothing capacitor 106. The other terminal of the coil 102 and the drain of the N-channel MOS transistor 105 are connected to each other.

In the example of FIG. 1, the control circuit 107 includes a switching signal output terminal 108, the power source terminal 109, and a feedback terminal 110. The switching signal output terminal 108 outputs a switching signal for driving the N-channel MOS transistor 105 to the gate of the N-channel MOS transistor 105. The gate of the N-channel MOS transistor 105 is connected to the switching signal output terminal 108. The source of the N-channel MOS transistor 105 is connected to a ground terminal. The N-type terminal of the diode 103 is connected to the feedback terminal 110 via the resistor 112 forming a portion of the bleeder resistor. The control circuit 107 controls the first boosted power by controlling the N-channel MOS transistor 105 based on the input of the feedback terminal 110.

In the example of FIG. 1, the boost DC-DC converter 100 includes switching element 117. The second boost circuit 115 includes an input terminal 118, a switching signal output terminal 119, and an output terminal 120. The input terminal 118 of the second boost circuit 115 is connected to the input terminal 101. The output terminal 120 is connected to a ground terminal via the storage capacitor 116. The output terminal 120 is connected to the power source terminal 109 of the control circuit 107 of the first boost circuit 100a via the switching element 117. The N-type terminal of the diode 104 is connected to a ground terminal via the switching element 117 and the storage capacitor 116. The N-type terminal of the diode 104 is connected to the output terminal 120 of the second boost circuit 115 via the switching element 117. The switching signal output terminal 119 of the second boost circuit 115 is connected to the switching element 117. The switching signal output terminal 119 outputs a switching signal for driving the switching element 117 to the switching element 117. In this example of FIG. 1, the switching element 117 is a switching device such as the N-channel MOS transistor.

In this example, as the second boost circuit 115, a flying capacitor boost circuit, a charge pump boost circuit incorporating a boost capacitor, or the like can be used.

In the boost DC-DC converter 100 of the first embodiment, when the voltage of the storage power stored in the storage capacitor 116 is equal to or higher than the minimum operation voltage of the first boost circuit 100a, the first boost circuit 100a starts a boost operation with the storage power as the operation power source.

In the example of FIG. 1, when the voltage of the storage power is equal to or higher than the minimum operation voltage of the control circuit 107 of the first boost circuit 100a, the second boost circuit 115 turns on the switching element 117. As a result, the storage power is supplied to the control circuit 107, and thus, the control circuit 107 enters a state in which the control circuit 107 can switch the N-channel MOS transistor 105 with the storage power as the operation power source. Next, the control circuit 107 starts switching of the N-channel MOS transistor 105. Thus, the first boost circuit 100a starts the boost operation.

When the voltage of the third boosted power output from the diode 104 is equal to or higher than the minimum operation voltage, the control circuit 107 enters a state in which the control circuit 107 can switch the N-channel MOS transistor 105 by using the third boosted power supplied to the control circuit 107. When the voltage of the third boosted power is equal to or higher than the minimum operation voltage, the first boost circuit 100a performs the boost operation with the third boosted power as the operation power source.

Figure 2:
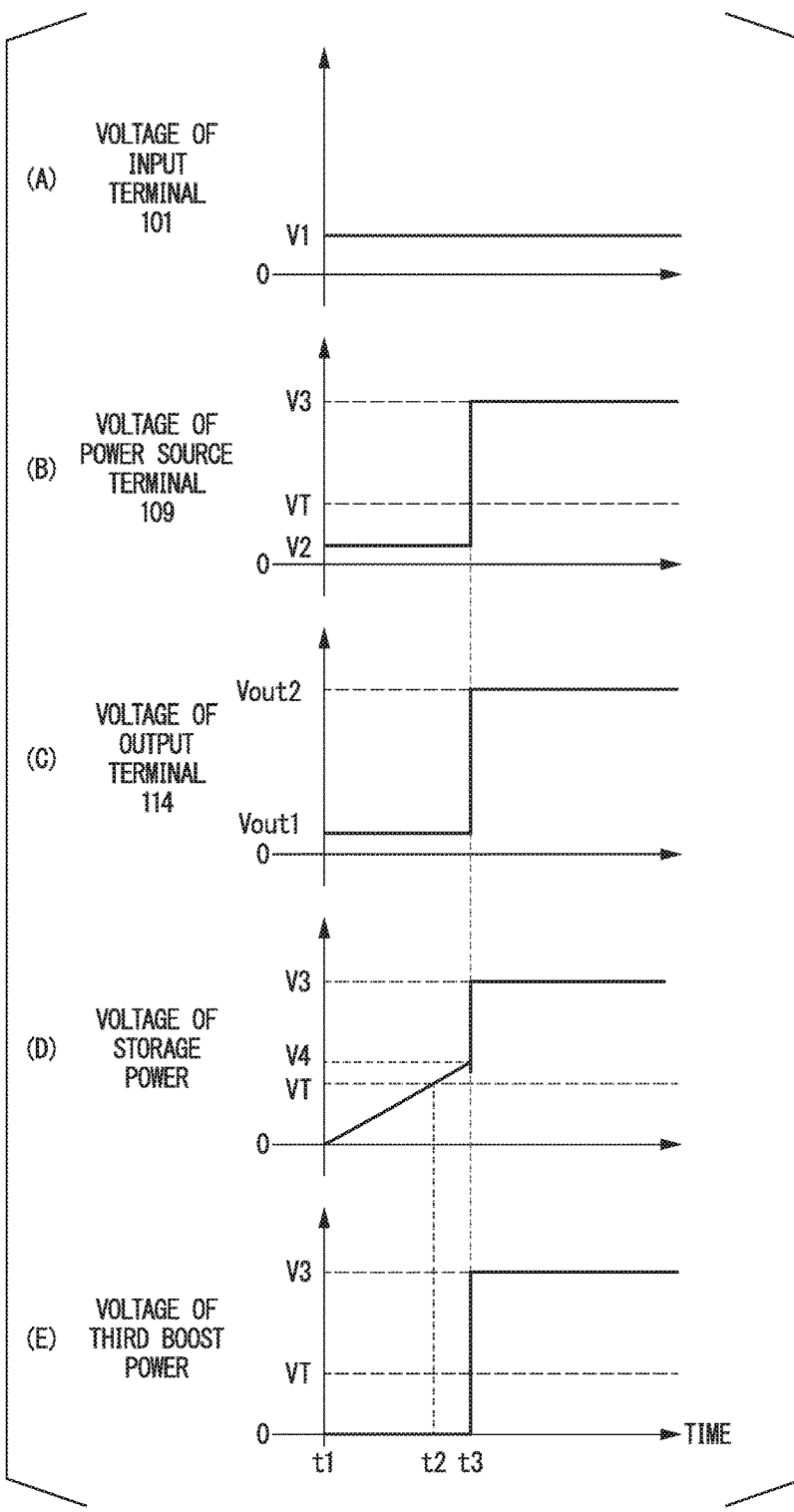
FIG. 2 is a diagram showing an example of an operation waveform of the boost DC-DC converter of the first embodiment.

FIG. 2 is a diagram showing an example of an operation waveform of the boost DC-DC converter 100 of the first embodiment. A horizontal axis in FIG. 2 indicates time. A vertical axis in (A) of FIG. 2 indicates the voltage of the input terminal 101. A vertical axis in (B) of FIG. 2 indicates the voltage of the power source terminal 109 of the control circuit 107. A vertical axis in (C) of FIG. 2 indicates the voltage of the output terminal 114. A vertical axis in (D) of FIG. 2 indicates the voltage of the storage power stored by the storage capacitor 116. A vertical axis in (E) of FIG. 2 indicates the voltage of the third boosted power output from the diode 104 of the first boost circuit 100a.

In the example of FIG. 2, at time t1, the input power is supplied to the input terminal 101 and the voltage of the input terminal 101 becomes a value V1. The input power supplied to the input terminal 101 is supplied to the input terminal 118 of the second boost circuit 115. The second boost circuit 115 generates the second boosted power having a value V4 which is a higher voltage than the value V1 of the voltage of the input power, from the input power. The second boost circuit 115 outputs the second boosted power to the output terminal 120. The second boosted power output from the output terminal 120 is stored in the storage capacitor 116 as the storage power. Accordingly, after time t1, the voltage of the storage power gradually increases. The second boost circuit 115 monitors the voltage (the voltage of the storage power stored in the storage capacitor 116) of the output terminal 120.

At time t1, the first boost circuit 100a has not yet started the boost operation. Accordingly, the value of the first boosted power generated by the first boost circuit 100a becomes zero. The value of the voltage of the third boosted power output from the diode 104 becomes zero.

At time t1, a value Vout1 of the voltage of the output terminal 114 is lower than the value V1 of the voltage of the input terminal 101 by a forward voltage drop in the diode 103.

At time t1, the second boost circuit 115 does not turn on the switching element 117. At time t1, the switching element 117 is in a turned-off state. Accordingly, the second boosted power generated by the second boost circuit 115 is not supplied to the power source terminal 109 of the control circuit 107. As a result, a value V2 of the voltage in the power source terminal 109 of the control circuit 107 is lower than the value V1 of the voltage of the input terminal 101 by a forward voltage drop in the diode 104.

In the example of FIGS. 1 and 2, the forward voltage drop in the diode 104 is smaller than the forward voltage drop in the diode 103. Accordingly, the value V2 of the voltage of the power source terminal 109 of the control circuit 107 is higher than the Vout1 of the voltage of the output terminal 114 at time t1.

Subsequently, in the example of FIG. 2, at time t2, the voltage of the storage power reaches a minimum operation voltage VT of the control circuit 107 of the first boost circuit 100a. At time 2, when the storage power is supplied to the power source terminal 109 of the control circuit 107, the control circuit 107 enters a state in which the control circuit 107 can output the switching signal to the N-channel MOS transistor 105. In the example of FIG. 2, at time t2, the storage power has not yet supplied to the power source terminal 109 of the control circuit 107.

Subsequently, in the example of FIG. 2, at time t3, the voltage of the storage power becomes equal to a value V4 of the voltage of the second boosted power generated by the second boost circuit 115. The value V4 is higher than the minimum operation voltage VT.

At time t3, the second boost circuit 115 stops the boost operation and turns on the switching element 117. Accordingly, the storage power is supplied to the power source terminal 109 of the control circuit 107 via the switching element 117. As a result, the voltage of the power source terminal 109 of the control circuit 107 becomes higher than the minimum operation voltage VT. Accordingly, the control circuit 107 can switch the N-channel MOS transistor 105 with the storage power as the operation power source. The switching signal output terminal 108 of the control circuit 107 outputs the switching signal for driving the N-channel MOS transistor 105 to the gate of the N-channel MOS transistor 105.

The example of FIG. 2, at time t3, the control circuit 107 starts the switching of the N-channel MOS transistor 105.

More specifically, when the control circuit 107 turns on the N-channel MOS transistor 105, power is stored in the coil 102. When the control circuit 107 turns off the N-channel MOS transistor 105, the power stored in the coil 102 is output to the output terminal 114 via the diode 103. The first boost circuit 100a repeats power accumulation and power discharge performed by the coil 102 to generate the first boosted power.

At time t3, the first boost circuit 100a starts the boost operation of generating the first boosted power with the storage power as the operation power source. Accordingly, at time t3, the first boosted power becomes larger than zero. The first boosted power is output to the output terminal 114 via the diode 103. Accordingly, the voltage of the output terminal 114 increases from the value Vout1 to a value Vout2.

The voltage of the output terminal 114 is divided by the resistor 112 and the resistor 113 and is input to the feedback terminal 110 of the control circuit 107.

After the boost operation of the first boost circuit 100a is started (after time t3), the control circuit 107 controls the switching of the N-channel MOS transistor 105 such that the voltage of the feedback terminal 110 becomes a predetermined value. Accordingly, the control circuit 107 controls the voltage of the output terminal 114 to the desired value Vout2.

After time t3, a portion of the power stored in the coil 102 is output from the diode 104 to the power source terminal 109 of the control circuit 107 as the third boosted power. The value V3 of the voltage of the power source terminal 109 is higher than the minimum operation voltage VT.

Accordingly, after time t3, the control circuit 107 switches the N-channel MOS transistor 105 with the third boosted power as the operation power source. The first boost circuit 100a performs the boost operation, which generates the first boosted power, with the third boosted power as the operation power source.

As described above, after time t3, the first boost circuit 100a performs the boost operation, which generates the first boosted power, with the third boosted power as the operation power source. Accordingly, the second boosted power is not required. Therefore, in the example of FIG. 2, after time t3, the second boost circuit 115 does not generate the second boosted power.

The turned-on state of the switching element 117 is maintained. Accordingly, the value of the voltage of the storage power becomes equal to the value V3 of the voltage of the power source terminal 109.

In the example of FIGS. 1 and 2, as described above, the forward voltage drop in the diode 104 is lower than the forward voltage drop in the diode 103. Accordingly, the value V3 of the voltage of the power source terminal 109 of the control circuit 107 after time t3 is higher than the value Vout2 of the voltage of the output terminal 114 after time t3.

As described above, in the boost DC-DC converter 100 of the first embodiment, when the voltage of the storage power is equal to or higher than the minimum operation voltage VT of the first boost circuit 100a, the first boost circuit 100 starts the boost operation with the storage power as the operation power source. Accordingly, it is possible to start the boost operation of the first boost circuit 100a even when the voltage of the input power is low. The boost capability required in the second boost circuit 115 can be suppressed comparing with the example when the storage capacitor 116 is not provided.

As described above, in the example of FIG. 2, after time t3, the second boost circuit 115 does not generate the second boosted power. Accordingly, it is possible to eliminate the necessity of controlling the second boost circuit 115 after time t3 when the voltage of the third boosted power becomes the value V3 equal to or higher than the minimum operation voltage VT.

As described above, in the example of FIG. 1, the output terminal 114 of the boost DC-DC converter 100 is connected to the load 200. The first boosted power output from the output terminal 114 drives the load 200. In the example of FIG. 2, after time t3, the first boosted power becomes a value equal to or higher than the power consumption of the load 200.

In the example of FIG. 2, even when the power of the input power is low, the first boost circuit 100a can start the boost operation with the storage power having higher voltage than the voltage of the input power as the operation power source. When the boost operation is started (time t3), the first boosted power (conversion power) exceeds the power consumption of the load 200. The boost DC-DC converter 100 outputs the first boosted power (conversion power) exceeding the power consumption of the load 200 by the input of the input power having a lower voltage than the minimum operation voltage VT. In the boost DC-DC converter 100, the size thereof is small and the conversion loss thus becomes lower.

The second boost circuit 115 needs to be a circuit which has a lower minimum operation voltage than that of the first boost circuit 100a and can boost even when the input voltage is low, and the power conversion capability of the second boost circuit 115 may be smaller than that of the first boost circuit 100a. Accordingly, the size of the second boost circuit 115 can be decreased.

Figure 3:
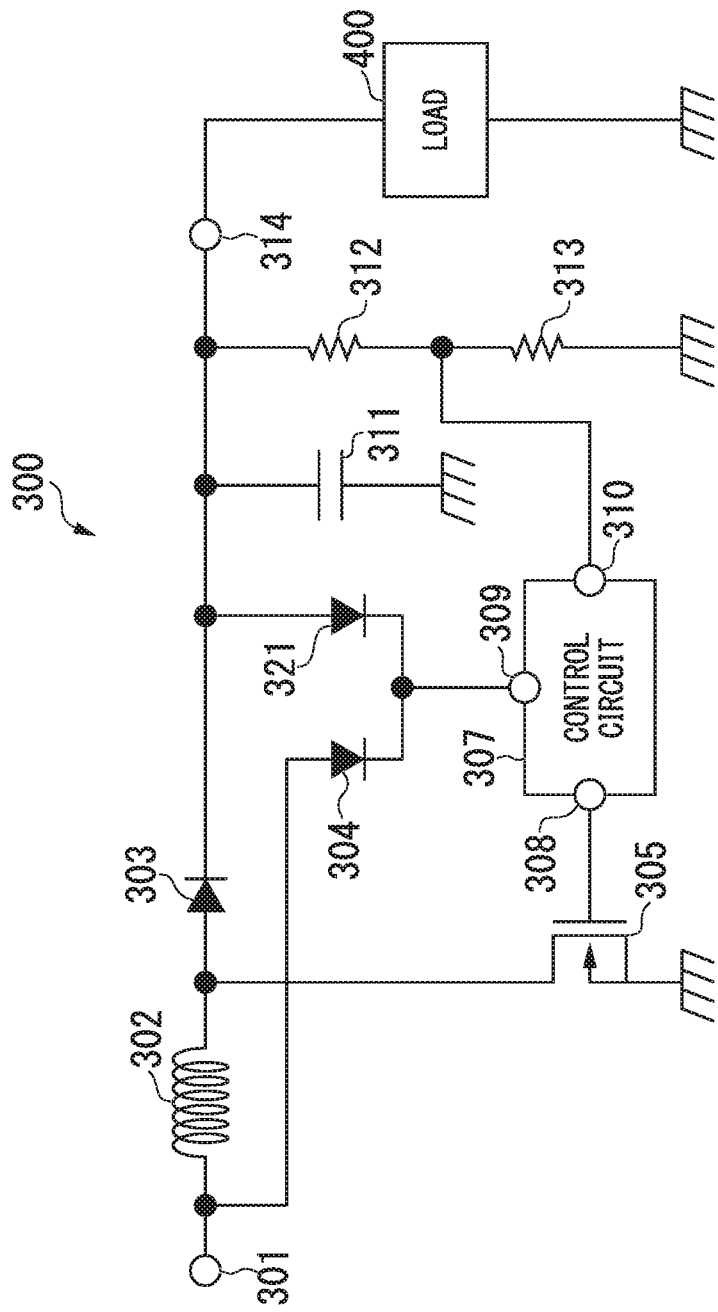
FIG. 3 is a schematic circuit diagram of a conventional boost DC-DC converter.

In the conventional circuit of FIG. 3, the control circuit 307 switches the N-channel MOS transistor 305 with boosted power having voltage decreased by a forward voltage drop in the diode 303 and the diode 321 as an operation power source. On the other hand, in the example of the first embodiment of FIG. 1, the control circuit 107 switches the N-channel MOS transistor 105 with the third boosted power having the voltage decreased by only the forward voltage drop in the diode 104 as the operation power source. Accordingly, compared to the example of the conventional circuit of FIG. 3, in the example of the first embodiment of FIG. 1, it is possible to adopt a configuration in which the first boosted power (conversion power) is small, the size thereof can be decreased, and the conversion loss can be decreased.

In the example of FIG. 2, the second boosted power generated by the second boost circuit 115 is stored in the storage capacitor 116. When the voltage of the storage power stored in the storage capacitor 116 is equal to or higher than the minimum operation voltage VT of the first boost circuit 100a, the control circuit 107 starts the boost operation by the first boost circuit 100a with the storage power as the operation power source. Accordingly, unlike the example of the conventional circuit of FIG. 3, in the example of the first embodiment of FIG. 2, it is not necessary to drive the control circuit with the boosted power as the operation power source. In the example of the first embodiment of FIG. 2, even when the boost capability of the second boost circuit 115 is low, it is possible to drive the control circuit 107 by taking times to store electricity. Accordingly, it is possible to decrease the size of the second boost circuit 115.

In the example of FIG. 1, the diode 103 is used as the first rectifier and the diode 104 is used as the second rectifier, the present invention is not limited to this configuration only. In another example, instead of the diode, an arbitrary element, a circuit, or the like having a rectification function may be used.

Second Embodiment

In a boost DC-DC converter 100 of the second embodiment is configured to be similar to the boost DC-DC converter 100 of the above-described first embodiment except for the following matters. Therefore, according to the boost DC-DC converter 100 of the second embodiment, advantageous effects similar to those of the boost DC-DC converter 100 of the first embodiment can be exerted.

As of FIG. 1, the first boost circuit 100a of the boost DC-DC converter 100 of the above-described first embodiment is a boost chopper type voltage conversion circuit. On the other hand, in the boost DC-DC converter 100 of the second embodiment, in this example, another arbitrary voltage conversion circuit (not shown) such as a charge pump type voltage conversion circuit can be used as the first boost circuit 100a.

While preferred embodiments of the invention have been described and illustrated above, it should be understood that these are exemplary of the invention and are not to be considered as limiting. These embodiments and modifications can be performed in other various ways; therefore, additions, omissions, substitutions, and other modifications can be made without departing from the scope of the invention. These embodiments and modifications are included in the scope of the invention described in the claims and equivalence thereof. Furthermore, the embodiments and the modifications can be combined with each other.

What is claimed is:

1. A boost DC-DC converter comprising:
an input terminal;
an output terminal;
a first boost circuit configured to generate, from an input power to the input terminal, a first boosted power having a higher voltage than a voltage of the input power, and output the generated first boosted power from the output terminal;
a second boost circuit configured to generate, from the input power, a second boosted power having a higher voltage than the voltage of the input power;
a storage capacitor configured to store the second boosted power as a storage power, and supply the storage power to the first boost circuit as an operation power source of the first boost circuit; and
a switching element configured to connect the storage capacitor and the first boost circuit, the switching element being configured to be turned on by the second boost circuit that monitors a voltage of the storage power,
wherein at a first time when the voltage of the storage power reaches a minimum operation voltage of the first boost circuit, the storage power is not supplied to the first boost circuit, and at a second time after the first time, the voltage of the storage power becomes a value that is higher than the minimum operation voltage, the switching element is turned on by the second boost circuit, the storage power is supplied to the first boost circuit, and the first boost circuit starts a boost operation with the storage power as the operation power source.

2. The boost DC-DC converter according to claim 1, wherein the first boost circuit includes
a coil having a first terminal connected to the input terminal,
an N-channel MOS transistor configured to switch a current flowing from the other terminal of the coil to a ground terminal,
a first rectifier configured to rectify a pulse current output from a second terminal to output the first boosted power,
a second rectifier configured to connect to the first rectifier in parallel, and rectify the pulse current to output a third boosted power, and
a control circuit to which the third boosted power is input and configured to control the first boosted power by controlling the N-channel MOS transistor,
wherein the first boost circuit is configured to perform the boost operation with the third boosted power as the operation power source when a voltage of the third boosted power is equal to or higher than the minimum operation voltage.

3. A method of using the boost DC-DC converter according to claim 2, comprising: driving a load connected to the output terminal by the first boosted power output from the output terminal,
wherein the first boosted power is equal to or higher than a power consumption of the load.

4. A method of using the boost DC-DC converter according to claim 1, comprising: driving a load connected to the output terminal by the first boosted power output from the output terminal,
wherein the first boosted power is equal to or higher than a power consumption of the load.

* * * * *